United States Patent
Rodgers

[15] 3,695,299
[45] Oct. 3, 1972

| [54] | VALVES | | |
|---|---|---|---|
| [72] | Inventor: | Wilfred Newrick Rodgers, Littleover, England | |
| [73] | Assignee: | International Combustion (Holdings) Limited, London, England | |
| [22] | Filed: | July 20, 1970 | |
| [21] | Appl. No.: | 56,284 | |

[30] Foreign Application Priority Data

July 30, 1969 Great Britain............38280/69

[52] U.S. Cl................................138/94.3, 251/327
[51] Int. Cl...........................................F16l 55/10
[58] Field of Search .....138/94.3; 251/167, 195, 327, 251/328

[56] References Cited

UNITED STATES PATENTS

| 2,242,467 | 5/1941 | Hamer.....................138/94.3 |
| 1,476,344 | 12/1923 | McGee et al.............138/94.3 |
| 3,069,129 | 12/1962 | Grove.....................251/327 X |
| 3,215,157 | 11/1965 | Anderson...............251/327 X |

FOREIGN PATENTS OR APPLICATIONS

| 916,839 | 1/1963 | Great Britain.............251/327 |
| 701,344 | 1/1965 | Canada......................251/328 |

Primary Examiner—Herbert F. Ross
Attorney—Hall & Houghton

[57] ABSTRACT

A pipe-line blind valve, for blanking off pipe-lines, in which a plate having a hole of the same diameter as the pipe-line is movable from one position, in which the hole is aligned with the bore of the pipe-line, to a second position in which the pipe-line is blanked off, there being a seal to seal between the pipe-line and the plate.

1 Claim, 2 Drawing Figures

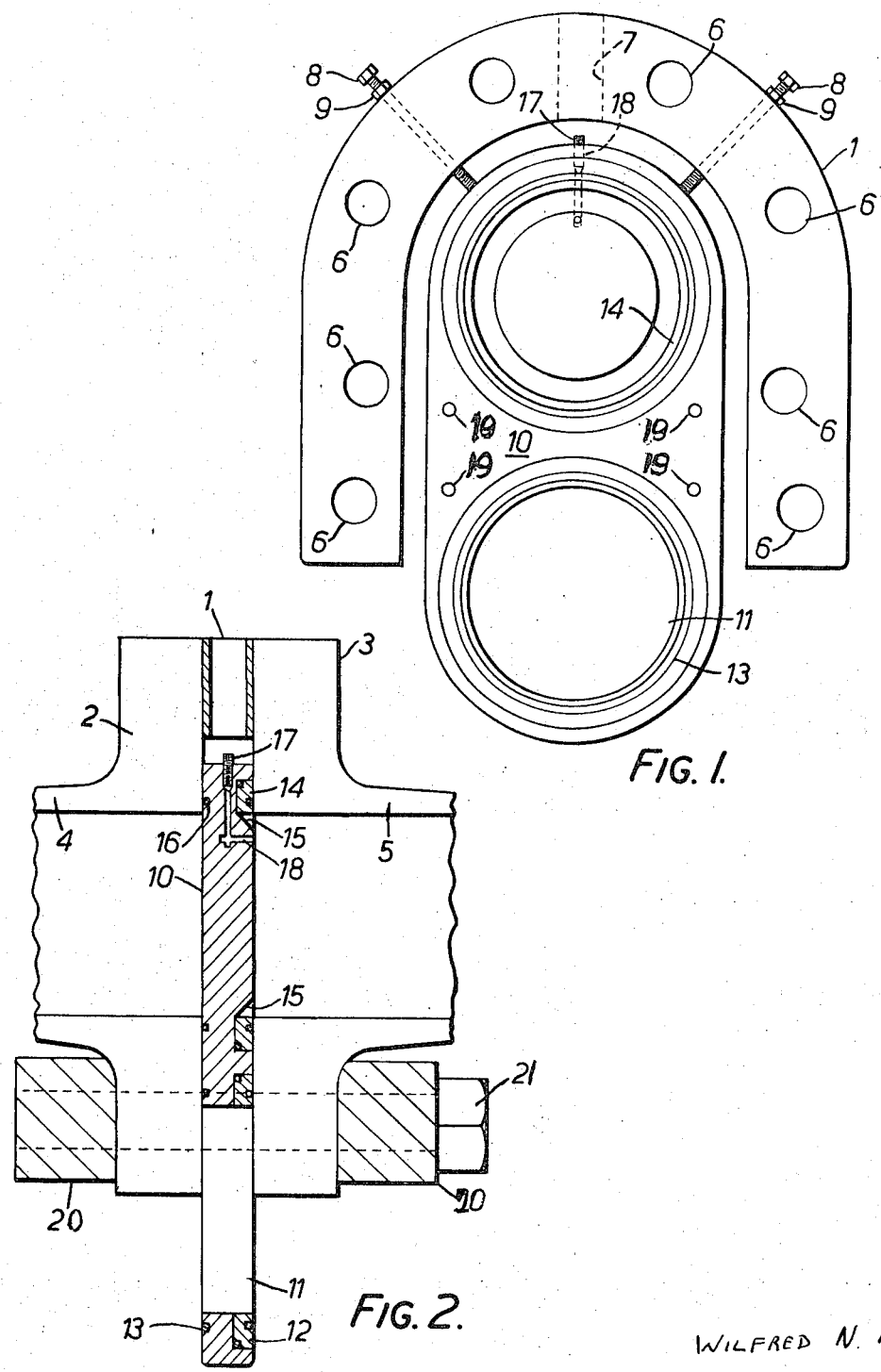

VALVES

This invention relates to valves and has particular reference to valves used to seal off a pipe line.

Such valves are commonly referred to as line blind valves and, traditionally, comprise a simple blanking-off plate which is inserted into the pipe line between the two flanges of a flanged joint. The flanged joint has to be opened-up to permit the insertion of the blanking-off plate and then re-made subsequently. When the line is to be re-opened the blanking-off plate is replaced by a plate with an aperture in it appropriate to the internal diameter of the pipe in order to avoid excessive displacement of the pipe line which would otherwise be necessary to compensate for the removal of the blanking-off plate. The blanking-off plate and the apertured plate are usually combined into a single plate having a blanking-off portion and an apertured portion. The condition of the pipe line can thus be readily identified as one portion of the single plate protrudes from the pipe and is visible to an observer. It will be appreciated that to change over the single plate from a "blind" to an "open" position necessitates opening-up the flanged joint, changing the position of the plate and re-making the joint and that this is a time-consuming operation and can involve risk of damage to the flanged joint.

It is accordingly an object of the present invention to provide a construction in which the disadvantages just mentioned are overcome.

By the present invention there is provided a pipe line blind valve comprising a component adapted to space adjacent ends of pipes in the pipe line and a plate locatable between adjacent ends and movable relative thereto, the plate having a blanking-off portion and an apertured portion, there being provided leak preventing means co-operable with at least one end and both portions of the plate.

The component may be secured between adjacent ends of the pipes. There may be provided leak preventing means co-operable with both ends and both portions of the plate. The plate may be rectangular with rounded ends in shape, and may be recessed in both faces to receive leak preventing means in the form of seals. The seals may be O-ring seals.

Some at least of seals may be axially movable under pressure in the pipe line to effect a seal between the plate and the adjacent pipe end. The axially movable seals may comprise a ring of substantially rectangular cross-section, the ring carrying a first O-ring engageable with the pipe end and a second O-ring engageable with the walls of the recess parallel to the interior of the pipe line.

The component may be a spacer of substantially U-shape and may incorporate flanges adapted to mate with flanges on the pipes in the pipe line.

By way of example only, an embodiment of the invention will now be described in greater detail with reference to the accompanying drawings of which:

FIG. 1 is an elevation of the embodiment, and

FIG. 2 is a section through the embodiment shown in position in a flanged joint.

The blind valve shown in the drawings comprises a U-shaped spacer 1 adapted to fit between the flanges 2, 3 of pipes 4, 5 respectively. The spacer 1 has holes 6 to permit the passage through it of bolts used to secure the flanges 2, 3 together. The spacer also has a passageway 7 and setting screws 8 locked in place by lock-nuts 9.

Located between the limbs of the spacer 1 is a rectangular plate 10 whose lower part (as seen in FIG. 1) has a circular aperture 11 whose diameter is the same as the bores of the pipes 4, 5. Surrounding the aperture 11 and recessed into one face of the plate 10 is a compound leak-preventing seal 12 which co-acts with the end face of pipe 5 in a manner to be described later. Surrounding the aperture 11 and recessed into the other face of the plate 10 is an O-ring seal 13 which co-acts with the end face of pipe 4.

The upper (as seen in FIG. 1) part of the plate 10 is not apertured but one face is recessed to receive a compound leak-preventing seal 14 which co-acts with the end face of the pipe. The recessing of the one face to receive the seal 14 includes a bevelled edge 15 which exposes the seal 14 to fluid pressure in pipe 5 as will be explained later in more detail. The other face of the upper part of the plate 10 is also recessed to receive an O-ring seal 16 whose location corresponds with that of the seal 14 and which co-acts with the end face of pipe 4.

Mounted in the upper (as seen in FIG. 1) edge of the plate 10 is a pressure release valve 17 which communicates with a passageway 18 in the plate as shown in FIG. 2.

The location of the plate 10 between the limbs of the spacer 1 is determined by the positions of the screws 8 and these are adjusted so that the compound seal 13 or 14 is located co-axially with the pipes depending upon the position of the plate. The plate 10 is retained in position by means of a dowel pin (not shown) which is passed through a hole in one or both of the flanges 2, 3 adjacent the open end of the spacer and through the appropriate one of holes 19 in the plate 10. If desired, two dowel pins may be used and the or each dowel pin may be spring-loaded to assist in retaining it in position.

To use the valve, the spacer 1 is placed between the flanges 2, 3 and securing bolts are placed in position and tightened-up. At the open end of the spacer, back beams 20 and bolts 21 are used to hold the flanges together. The back beams have holes in them to permit entry and removal of the dowel pin or pins mentioned above.

To remove the blind, it is necessary first to release the pressure acting on the seal 14 and the plate 10 and this is effected by closing the shut-off valve and releasing the pressure in pipe 5 by means of the pressure release valve 17 access to which is obtained via the passage 7. Once the pressure in pipe 5 has been released and the dowel pin or each dowel pin removed, the plate 10 can be easily withdrawn and replaced with the aperture 11 uppermost and thereby permitting communication between pipes 4 and 5. The or each dowel pin is then replaced and the pressure release valve 17 is shut. With the plate 10 in the position just described, leakage is prevented by the seals 12 and 13.

It will be appreciated that the condition of the pipe line, i.e., whether it is blanked-off or not is indicated by the projecting part of the plate 10. With the plate in the position shown in FIG. 2, the aperture 11 is visible indicating that the pipe line is blanked-off.

The O-ring seals 13 and 16 could be replaced by compound seals if desired. The plate can then be exposed to pressure on both sides without risk of fluid leakage.

The thickness of the spacer 1 is such that the plate 10 can be slid into and out of the gap between the flanges 2, 3. There is normally a shut-off valve in the pipe line upstream of the spacer 1 and when it is required to blank off the pipe line, the shut-off valve is closed and the plate 10 inserted into the spacer with the non-apertured part uppermost as shown in FIG. 2. The seal 14 faces in the direction of the shut-off valve so that when the latter is opened, the seal is exposed to fluid pressure in pipe 5 and the pressure forces the seal into close engagement with the end face of pipe 5. The same pressure, acting through the plate 10 also maintains O-ring seal 16 in close engagement with the end face of pipe 4.

It will also be appreciated that the spacer might be of a form which incorporated flanges which are adapted to mate with the pipe flanges when the valve is placed in position.

I claim:
1. A pipe line blind valve including
a spacing component adapted to be disposed between adjacent pipe ends of the pipe line to maintain a gap therebetween,
a plate removably disposable in the gap, the plate having a blanking-off portion and an apertured portion,
sealing means arranged to provide a seal between both portions of the plate and at least one of the pipe ends in response to fluid pressure in the pipe line, and
bleed means in the plate arranged to enable fluid pressure in the pipe line to be released.

* * * * *